United States Patent
Kawaguchi et al.

(10) Patent No.: US 12,476,438 B2
(45) Date of Patent: Nov. 18, 2025

(54) OPTICAL DEVICE AND LIGHT EMITTING DEVICE

(71) Applicant: KYOCERA Corporation, Kyoto (JP)

(72) Inventors: Yoshinobu Kawaguchi, Kyoto (JP); Takeshi Kamikawa, Kyoto (JP)

(73) Assignee: KYOCERA Corporation, Kyoto (JP)

( * ) Notice: Subject to any disclaimer, the term of this patent is extended or adjusted under 35 U.S.C. 154(b) by 968 days.

(21) Appl. No.: 17/585,643

(22) Filed: Jan. 27, 2022

(65) Prior Publication Data

US 2022/0247157 A1 Aug. 4, 2022

(30) Foreign Application Priority Data

Feb. 1, 2021 (JP) .................. 2021-014594

(51) Int. Cl.
*H01S 5/40* (2006.01)
*H01S 5/02345* (2021.01)

(52) U.S. Cl.
CPC ........ *H01S 5/4093* (2013.01); *H01S 5/02345* (2021.01)

(58) Field of Classification Search
CPC ............................ H01S 5/0236; H01S 5/4093
USPC ...................................................... 372/50.12
See application file for complete search history.

(56) References Cited

U.S. PATENT DOCUMENTS

| | | | | |
|---|---|---|---|---|
| 7,605,452 B2 * | 10/2009 | Yamanaka | .......... | H01L 23/5386 |
| | | | | 257/E23.008 |
| 11,257,996 B2 * | 2/2022 | Minato | ............... | H10H 20/8514 |
| 2003/0169796 A1 | 9/2003 | Nakamura et al. | | |
| 2003/0231685 A1 | 12/2003 | Nakamura et al. | | |
| 2005/0220159 A1 * | 10/2005 | Bessho | ................. | H01S 5/4025 |
| | | | | 372/50.12 |
| 2006/0055309 A1 * | 3/2006 | Ono | .................... | H01L 25/0753 |
| | | | | 257/E33.059 |

FOREIGN PATENT DOCUMENTS

| | | |
|---|---|---|
| JP | H07-135369 A | 5/1995 |
| JP | H07-193312 A | 7/1995 |
| JP | 2002-340564 A | 11/2002 |
| JP | 2003-264334 A | 9/2003 |
| JP | 2010-199274 A | 9/2010 |
| JP | 2011-199137 A | 10/2011 |
| JP | 2013-016585 A | 1/2013 |

\* cited by examiner

*Primary Examiner* — Minsun O Harvey
(74) *Attorney, Agent, or Firm* — Volpe Koenig (57) ABSTRACT

A substrate includes an upper surface and wiring lines disposed on the upper surface. The first optical semiconductor element is disposed on the upper surface of the substrate, and the second optical semiconductor element is adjacent to the first optical semiconductor element. The first optical semiconductor element includes a first electrode and a second electrode each disposed at a lower end portion of the first optical semiconductor element, and each of the first electrode and the second electrode is connected to a corresponding one of the wiring lines.

15 Claims, 6 Drawing Sheets

OPTICAL DEVICE AND LIGHT EMITTING DEVICE

BACKGROUND OF THE INVENTION

The present disclosure relates to an optical device and a light emitting device.

In the multi-wavelength semiconductor laser device described in Patent Document 1, by mounting side by side a blue-violet laser diode and a two-wavelength laser diode each having a light-emitting point formed in the vicinity of a chip end, gaps between the three light emitting points can be brought close to each other.

CITATION LIST

Patent Literature

Patent Document 1: JP 2013-16585 A

SUMMARY OF INVENTION

An optical device of the present disclosure includes a substrate including an upper surface and wiring lines disposed on the upper surface, a first optical semiconductor element and a second optical semiconductor element each disposed on the upper surface of the substrate, the second optical semiconductor element being adjacent to the first optical semiconductor element. The first optical semiconductor element includes a first electrode and a second electrode each disposed at a lower end portion of the first optical semiconductor element and each connected to a corresponding one of the wiring lines.

Further, a light emitting device of the present disclosure includes the above-described optical device and a package on which the optical device is mounted.

DESCRIPTION OF EMBODIMENTS

Figure 1:
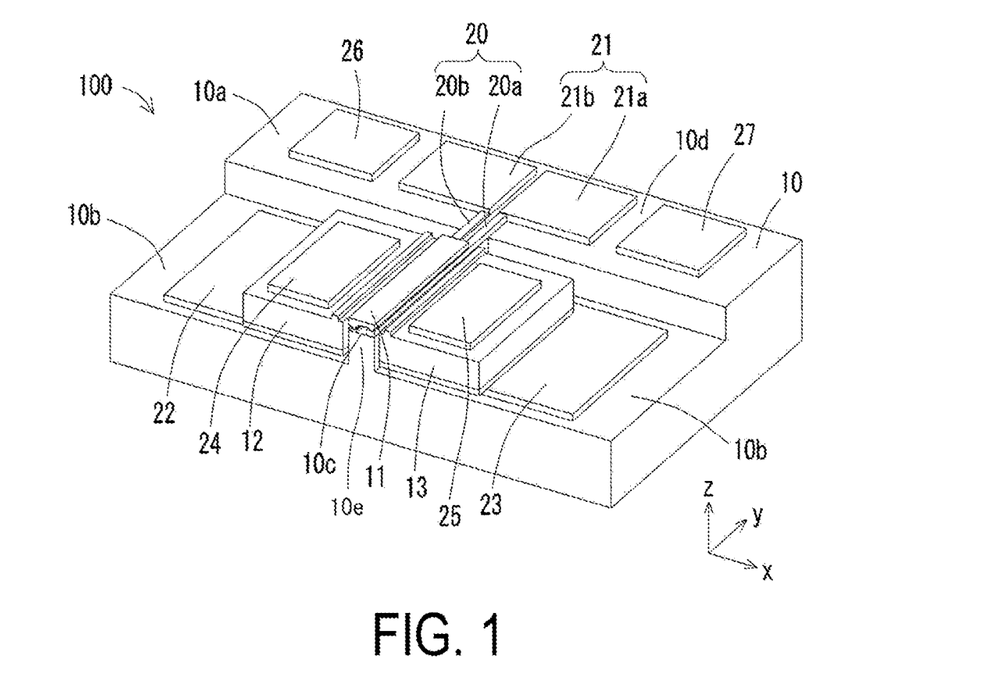
FIG. 1 is a perspective view of an optical device of an embodiment of the present disclosure.
Figure 2:
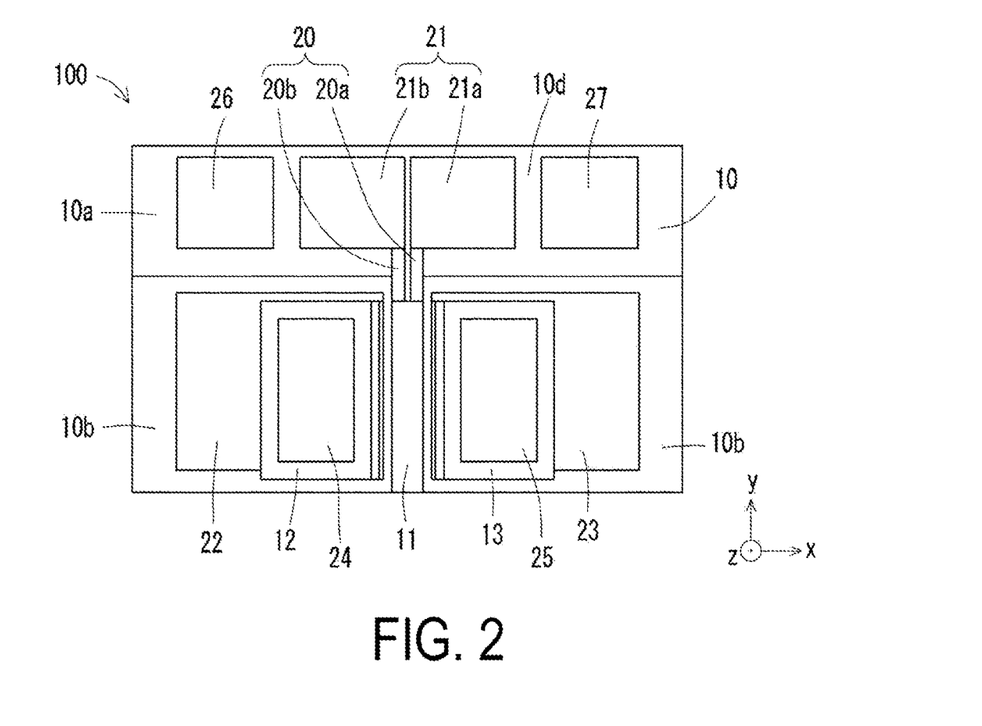
FIG. 2 is a plan view of the optical device.
Figure 3A:
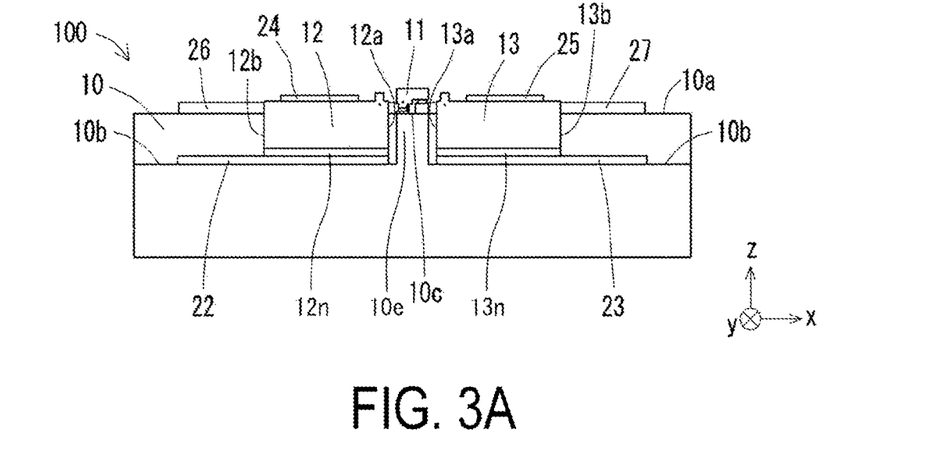
FIG. 3A is a front view of the optical device.
Figure 3B:
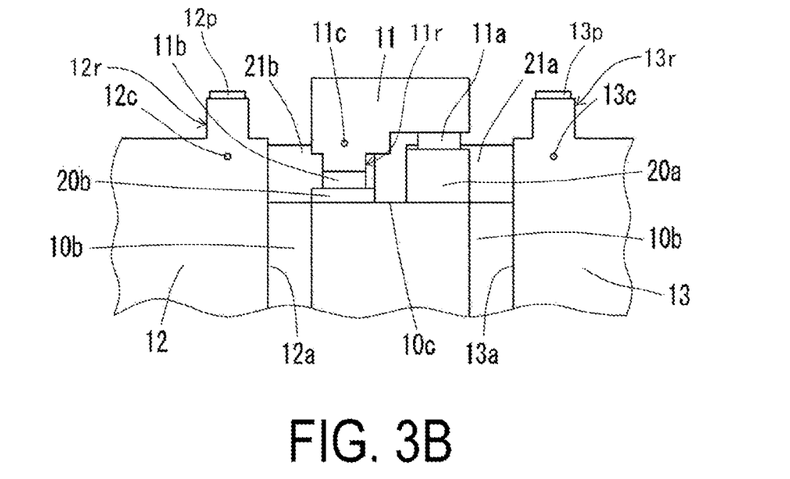
FIG. 3B is an enlarged view of the vicinity of a first optical semiconductor element.

Hereinafter, embodiments of the optical device of the present disclosure will be described in detail with reference to the attached drawings. FIG. 1 is a perspective view of an optical device of a first embodiment. FIG. 2 is a plan view of the optical device. FIG. 3A is a front view of the optical device. FIG. 3B is an enlarged view of the vicinity of the first optical semiconductor element. An optical device 100 includes a substrate 10, a first optical semiconductor element 11, and a second optical semiconductor element 12.

The substrate 10 includes an upper surface 10a and wiring lines 20 disposed on the upper surface 10a. The first optical semiconductor element 11 is disposed on the upper surface 10a of the substrate 10, and the second optical semiconductor element 12 is adjacent to the first optical semiconductor element 11. The first optical semiconductor element 11 includes a first electrode 11a and a second electrode 11b each disposed at a lower end portion of the first optical semiconductor element 11, and the first electrode 11a and the second electrode 11b are respectively connected to the wiring lines 20. Note that a direction in which the optical semiconductor elements are adjacent to each other is referred to as an x direction, a thickness direction of the substrate 10 is referred to as a z direction, and a direction orthogonal to the x direction and the z direction is referred to as a y direction.

The optical device 100 of the present embodiment may further include a third optical semiconductor element 13. The third optical semiconductor element 13 is adjacent to the first optical semiconductor element 11, similar to the second optical semiconductor element 12. The third optical semiconductor element 13 is located on an opposite side of the second optical semiconductor element 12 with the first optical semiconductor element 11 interposed between the third optical semiconductor element 13 and the second optical semiconductor element 12.

In the present embodiment, the upper surface 10a of the substrate 10 includes at least one recessed portion (first recessed portion) 10b, and the second optical semiconductor element 12 is mounted in the one recessed portion 10b. The first optical semiconductor element 11 is mounted on a mounting region 10c which is a region of the upper surface 10a excluding the recessed portion 10b and is adjacent to the recessed portion 10b, and the first optical semiconductor element 11 and the second optical semiconductor element 12 are adjacent to each other. The upper surface 10a of the substrate 10 further includes another one recessed portion (second recessed portion) 10b, and the third optical semiconductor element 13 is mounted in the recessed portion (second recessed portion) 10b. The recessed portion 10b on which the third optical semiconductor element 13 is mounted is opposite to the recessed portion 10b on which the second optical semiconductor element 12 is mounted with the mounting region 10c on which the first optical semiconductor element 11 is mounted interposed between the two recessed portions 10b, and the first optical semiconductor element 11 and the third optical semiconductor element 13 are adjacent to each other.

In the present embodiment, for example, when the substrate 10 is viewed in a plan view, the two recessed portions 10b have rectangular shapes having substantially the same size, and the mounting region 10c is located between the two recessed portions 10b. In other words, the substrate 10 includes a protruding portion 10e protruding upward with respect to a bottom surface of the two recessed portions 10b, and an upper surface of the protruding portion 10e serves as the mounting region 10c. Further, the upper surface 10a includes, in a plan view, a connection region 10d adjacent to the two recessed portions 10b and the mounting region 10c, and extending parallel to a direction in which the two recessed portions 10b and the mounting region 10c are aligned. For example, external connection pads 21 for electrically connecting to an external circuit are disposed in the connection region 10d. The mounting region 10c and the connection region 10d may be continuous at the same height.

The mounting region 10c may have the same shape as a plan view shape of the first optical semiconductor element 11. The wiring lines 20 extend along a length direction of the first optical semiconductor element 11. A first end of each of the wiring lines 20 is located in the mounting region 10c, and a second end is located in the connection region 10d. The wiring lines 20 extend along a length direction of the first optical semiconductor element 11. The second end of the wiring lines 20 is connected to the external connection pad 21 at the connection region 10d. The wiring lines 20 include a first wiring line 20a connected to the first electrode 11a and a second wiring line 20b connected to the second electrode 11b, of the first optical semiconductor element 11. The external connection pads 21 include a first pad 21a connected to the first wiring line 20a and a second pad 21b connected to the second wiring line 20b. The external connection pads 21 can be electrically connected to the external circuit, for example, via a bonding wire or the like.

The first optical semiconductor element 11, the second optical semiconductor element 12, and the third optical semiconductor element 13 are, for example, semiconductor laser devices having a structure in which a plurality of semiconductor layers are layered on one another. Each device includes a laminate body in which, for example, a p-type electrode, a p-type semiconductor layer, an active layer, an n-type semiconductor layer, and an n-type electrode are layered on one another. Further, in each of the devices, one end surface of both end surfaces in a resonator length direction is an emission surface, and the other end surface is a reflective surface. There is an emission point for emitting light at a position of the active layer of the emission surface. Further, each device may have a support substrate for supporting the above-described laminate body. The support substrate may be, for example, utilized as a substrate for epitaxially growing a semiconductor layer included in the above-described laminate body.

In each optical semiconductor element, hereinafter, a layering direction is referred to as a thickness direction, a resonator length direction orthogonal to the layering direction is referred to simply as a length direction, and a direction orthogonal to the resonator length direction is referred to as a width direction. Note that the first optical semiconductor element 11 has a single-sided electrode structure in which the first electrode 11a serving as the n-type electrode and the second electrode 11b serving as the p-type electrode are located on one side in the thickness direction. The second optical semiconductor element 12 and the third optical semiconductor element 13 have a two-sided electrode structure in which a p-type electrode (third electrode) is located on one side in the thickness direction, and an n-type electrode (fourth electrode) is located on the other side in the thickness direction. The second optical semiconductor element 12 and the third optical semiconductor element 13 may have a two-sided electrode structure in which a semiconductor substrate serving as the support substrate is located between the n-type semiconductor layer and the n-type electrode, and the laminate body is supported by the semiconductor substrate. The semiconductor substrate may be an n-type semiconductor substrate.

In the present embodiment, the first optical semiconductor element 11 is smaller in width than the second optical semiconductor element 12. Further, in the present embodiment, the first optical semiconductor element 11 is smaller also in thickness than the second optical semiconductor element 12. The first optical semiconductor element 11 may have the same length (length in the y direction) as the second optical semiconductor element 12. For example, the width of the first optical semiconductor element 11 is from 10 to 100 μm, and the width of the second optical semiconductor element 12 is from 100 to 1000 μm. For example, the thickness of the first optical semiconductor element 11 is from 5 to 50 μm, and the thickness of the second optical semiconductor element 12 is from 50 to 300 μm. Note that the thickness of the first optical semiconductor element 11 may be thinner than that of the second optical semiconductor element 12 due to the support substrate being removed. In other words, in the present embodiment, the second optical semiconductor element 12 includes the support substrate, and the first optical semiconductor element 11 does not include the support substrate. Note that the entirety of the support substrate need not be removed, and a portion thereof may be polished and thinned. Removal and polishing of the support substrate can be performed by various methods such as grinding and polishing, and substrate peeling using sacrificial layer etching or an Epitaxial Lateral Overgrowth (ELO) growth mask.

In the present embodiment, the third optical semiconductor element 13 may have the same size as the second optical semiconductor element 12. In the present embodiment, the first optical semiconductor element 11 is smaller in width than the third optical semiconductor element 13. Further, in the present embodiment, the first optical semiconductor element 11 is smaller in thickness than the third optical semiconductor element 13. For example, the width of the third optical semiconductor element 13 is from 100 to 1000 μm, and the thickness of the third optical semiconductor element 13 is from 50 to 300 μm. Note that the thickness of the first optical semiconductor element 11 may be thinner than that of the third optical semiconductor element 13. The thickness of the first optical semiconductor element 11 may be thinner than the thickness of the third optical semiconductor element 13 due to the support substrate being removed. In other words, in the present embodiment, the third optical semiconductor element 13 includes the support substrate, and the first optical semiconductor element 11 does not include the support substrate. Note that the entirety of the support substrate need not be removed, and a portion thereof may be polished and thinned.

As described above, the second optical semiconductor element 12 and the third optical semiconductor element 13 are respectively mounted in the recessed portions 10b, and the first optical semiconductor element 11 is mounted on the mounting region 10c serving as the upper surface of the protruding portion 10e located between the two recessed portions 10b. The protruding portion 10e is located between the second optical semiconductor element 12 and the third optical semiconductor element 13, and the third optical semiconductor element 13 is located on an opposite side of the second optical semiconductor element 12 with the protruding portion 10e interposed between the third optical semiconductor element 13 and the second optical semiconductor element 12. In this way, although the thickness of the first optical semiconductor element 11 is small, the heights of the second optical semiconductor element 12 and the third optical semiconductor element 13 can be made substantially equal to each other when mounted on the substrate 10. Each of the positions of the light emission points of the second optical semiconductor element 12 and the third optical semiconductor element 13 is unevenly located on one side rather than at the center in the thickness direction. For example, since the second semiconductor element 12 and the third semiconductor element 13 include a support substrate, in a case where the support substrate is mounted so as to be located on the substrate 10 side, the position of the emission point can be unevenly located.

Note that in the present embodiment, when mounting the support substrate in the recessed portion 10b, by directing the support substrate toward the bottom surface of the recessed portion 10b, the emission point is at a high position, that is, a position farther from the bottom surface of the recessed portion 10b. Since the first optical semiconductor element 11 is mounted on the mounting region 10c, a height position of the emission point of the first optical semiconductor element 11 and height positions of the emission points of the second optical semiconductor element 12 and the third optical semiconductor element 13 can be brought close to each other. Note that in the present embodiment, the second optical semiconductor element 12 and the third optical semiconductor element 13 are mounted so that the n-type electrode is located on the substrate 10 side, but may be mounted so that the p-type electrode is on the substrate 10 side. In this case, heat generated in the active layer is easily dissipated to the substrate, and thus heat dissipation is improved, so that characteristics and reliability are improved. At this time, in order to align with the light-emitting point of the first optical semiconductor element 11, the recessed portion 10b may be a shallow recessed portion, or the regions in which the second optical semiconductor element 12 and the third optical semiconductor element 13 are mounted may be protruding portions located above the mounting region 10c, or may be the same height as the mounting region 10c.

The second optical semiconductor element 12 further includes a first side surface 12a, a second side surface 12b located farther from the first optical semiconductor element 11 than the first side surface 12a and a second emission point 12c emitting light, and the second emission point 12c is located closer to the first side surface 12a side than the second side surface 12b. In order to form such a structure, for example, a so-called ridge waveguide may be used. By providing a ridge waveguide 12r on the first side surface 12a side, the second emission point 12c is located on the first side surface 12a side. In other words, since a portion of the active layer located below the ridge waveguide 12r emits light, the portion serves as an emission point. As described above, the second emission point 12c of the second optical semiconductor element 12 can be brought close to the first optical semiconductor element 11 in the width direction. Further, similarly in the third optical semiconductor element 13, by using a ridge waveguide 13r, a third emission point 13c can be brought close to the first optical semiconductor element 11 in the width direction. Specifically, the third optical semiconductor element 13 further includes a third side surface 13a, a fourth side surface 13b located farther from the first optical semiconductor element 11 than the third side surface 13a, and the third emission point 13c emitting light, and the third emission point 13c is located closer to the third side surface 13a side than the fourth side surface 13b.

External connection pads (second wiring lines) 22 and 23 connected to n-type electrodes 12n and 13n of the second optical semiconductor element 12 and the third optical semiconductor element 13 are provided on the bottom surface of the recessed portion 10b. The external connection pads 22 and 23 include portions extending outward in the width direction in a state where the second optical semiconductor element 12 and the third optical semiconductor element 13 are mounted, respectively. Each of these extending portions enable electrical connection to an external circuit, for example, via a bonding wire or the like.

Contrary to the n-type electrodes, p-type electrodes 12p and 13p of the second optical semiconductor element 12 and the third optical semiconductor element 13 are located on the upper surface of the second optical semiconductor element 12 and the third optical semiconductor element 13, respectively. Specifically, the p-type electrode 12p is disposed on an upper surface of the ridge waveguide 12r, and the p-type electrode 13p is disposed on an upper surface of the ridge waveguide 13r. Upper surface pads 24 and 25 connected to the p-type electrodes 12p and 13p are provided on the upper surfaces of the second optical semiconductor element 12 and the third optical semiconductor element 13. Each of the upper surface pads 24 and 25 can be electrically connected to an external circuit, for example, via a bonding wire or the like. External connection pads 26 and 27 may also be provided in the connection region 10d of the substrate 10. Each of the second optical semiconductor element 12 and the third optical semiconductor element 13 and the external connection pads 26 and 27 are electrically connected, for example, via a bonding wire or the like. Further, each of the external connection pads 26 and 27 and an external circuit can be electrically connected via a bonding wire or the like.

The first optical semiconductor element 11 has a single-sided electrode structure and, due to the structure, height positions of the first electrode 11a and the second electrode 11b differ from each other. In order to connect to two electrodes having different height positions, for example, as illustrated in FIG. 3B, wiring thicknesses of the first wiring line 20a connected to the first electrode 11a and the second wiring line 20b connected to the second electrode 11b may be made different from each other. By forming the first optical semiconductor element 11 to have a single-sided electrode structure, the mounting region 10c can be narrowed to a size similar to the width of the first optical semiconductor element 11. In a case where the mounting region 10c is narrow, the second optical semiconductor element 12 can be mounted close to the first optical semiconductor element 11. The first optical semiconductor element 11 is provided with the ridge waveguide 11r, and the ridge waveguide 11r is located above the second electrode 11b (in a direction away from the mounting region 10c in the z direction in FIG. 3B). In the first optical semiconductor element 11, the first emission point 11c is located above the ridge waveguide 11r (in a direction away from the mounting region 10c in the z direction in FIG. 3B). The first emission point 11c of the first optical semiconductor element 11 and the second emission point 12c of the second optical semiconductor element 12 are located closer together and adjacent to each other. The second emission point 12c of the second optical semiconductor element 12 is located above the mounting region 10c on the upper surface of the protruding portion 10e. Similarly, the third optical semiconductor element 13 can be mounted close to the first optical semiconductor element 11. The first emission point 11c of the first optical semiconductor element 11 and the third emission point 13c of the third optical semiconductor element 13 are located closer together and adjacent to each other. The third emission point 13c of the third optical semiconductor element 13 is located above the mounting region 10c on the upper surface of the protruding portion 10e.

Further, since the first optical semiconductor element 11 has a single-sided electrode structure, the first optical semiconductor element 11 has a so-called flip chip structure in which unlike the second optical semiconductor element 12, each of the pad electrodes on the element does not have to be electrically connected to an external circuit via a bonding wire. Thus, the first optical semiconductor element 11 can be operated normally, even in a case where the width of the first optical semiconductor element 11 is smaller than the width of the second optical semiconductor element 12 to such an extent that a bonding wire cannot be connected. Since the width of the first optical semiconductor element 11 is narrow, even in a case where the first optical semiconductor element 11 is present between the first optical semiconductor element 12 and the third optical semiconductor element 13, the emission points of the second optical semiconductor element 12 and the third optical semiconductor element 13 can be brought close to each other. The device widths of the second optical semiconductor element 12 and the third optical semiconductor element 13 may also be made narrower to have the flip chip structure, but in this case, manufacturing difficulty increases, yield decreases, and manufacturing cost increases.

Figure 4:
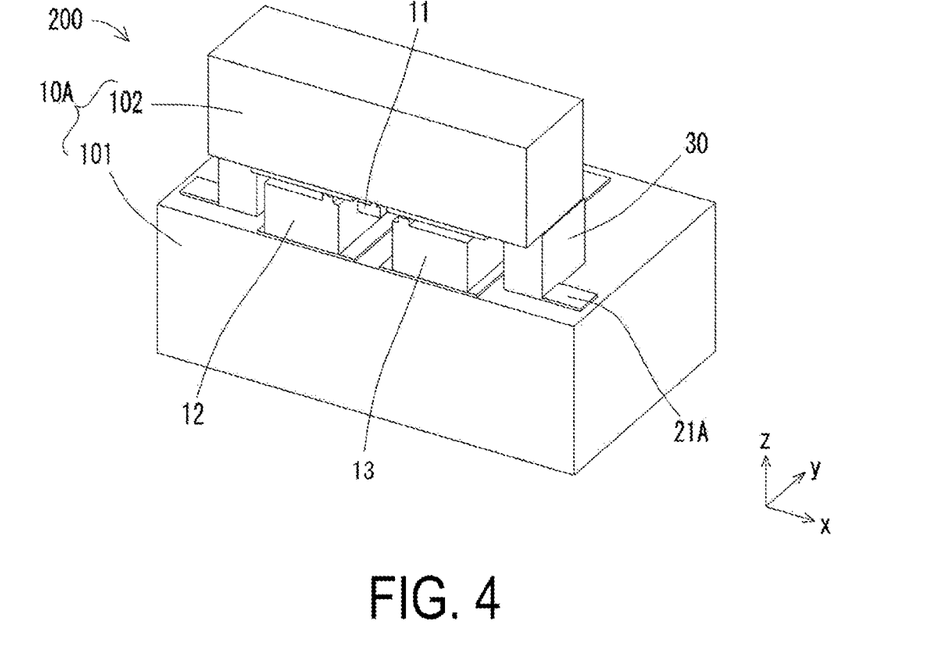
FIG. 4 is a perspective view of an optical device of a second embodiment.
Figure 5:
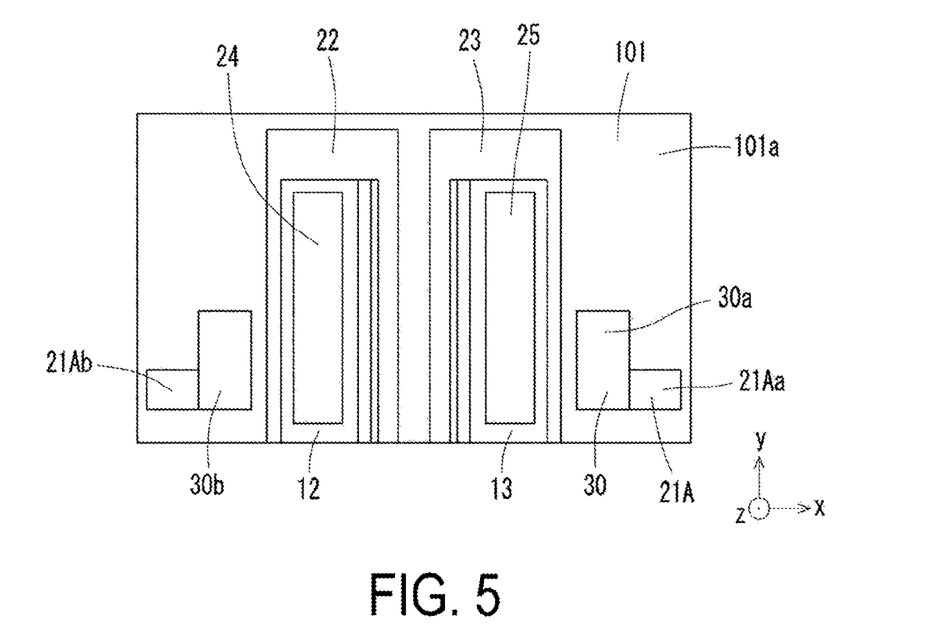
FIG. 5 is a plan view of a first substrate.
Figure 6:
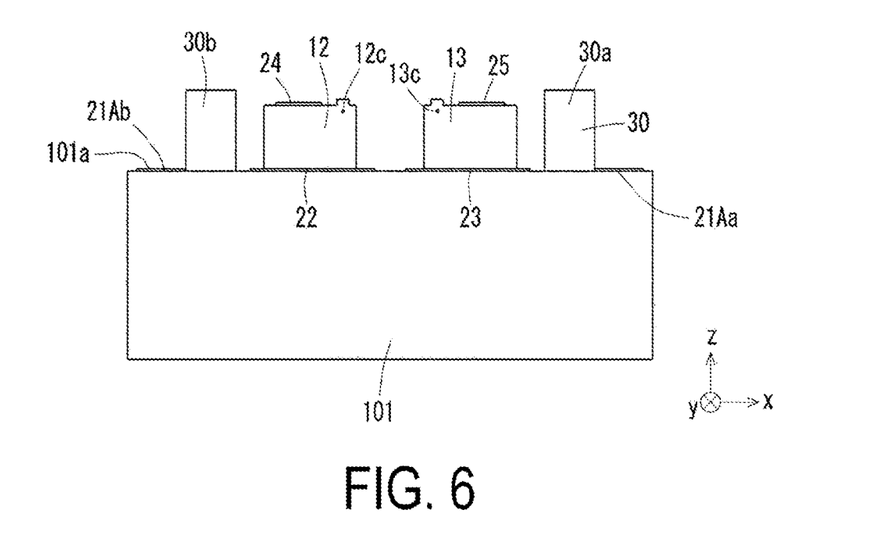
FIG. 6 is a front view of the first substrate.
Figure 7:
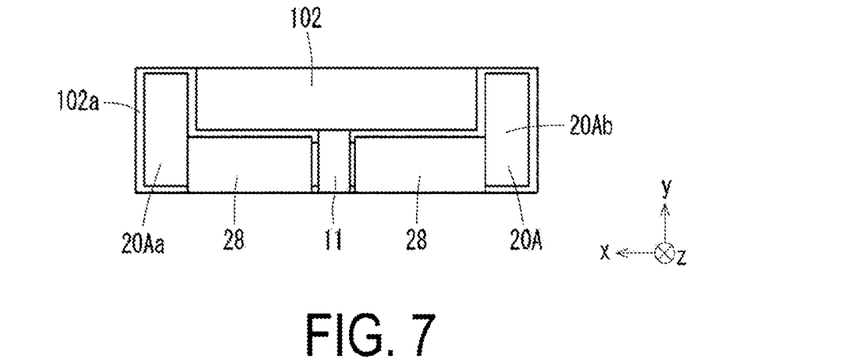
FIG. 7 is a plan view of a second substrate.
Figure 8A:
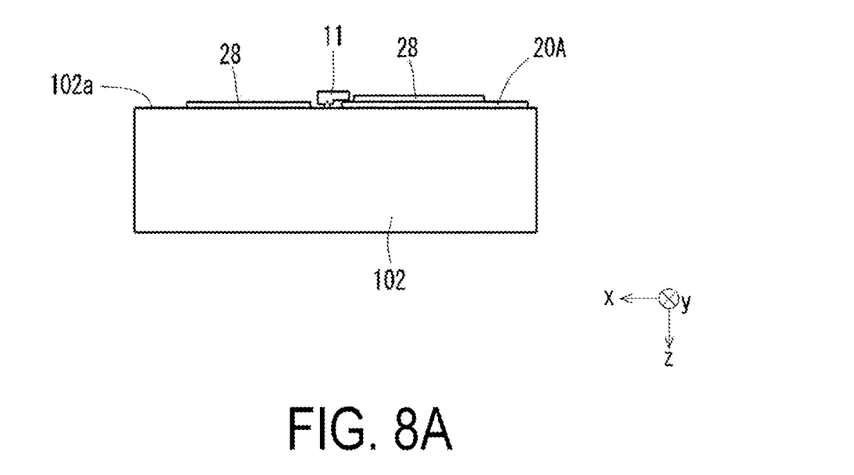
FIG. 8A is a front view of the second substrate.
Figure 8B:
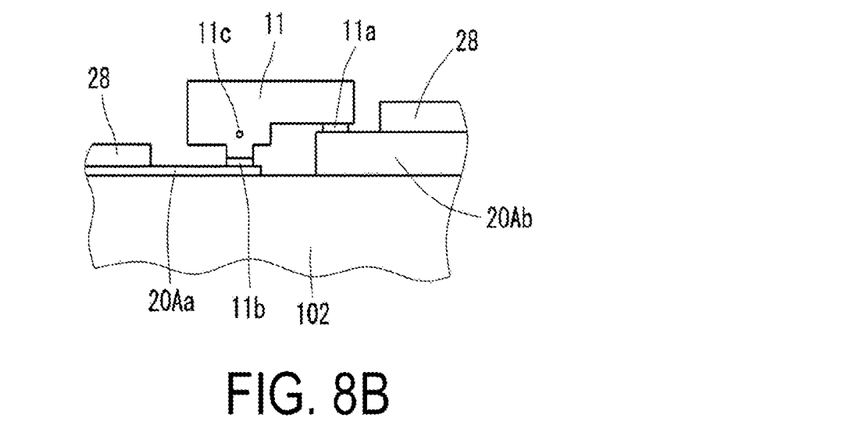
FIG. 8B is an enlarged view of the vicinity of the first optical semiconductor element.

Next, a second embodiment of the present disclosure will be described. FIG. 4 is a perspective view of an optical device of the second embodiment. FIG. 5 is a plan view of a first substrate. FIG. 6 is a front view of the first substrate. FIG. 7 is a plan view of a second substrate. FIG. 8A is a front view of the second substrate. FIG. 8B is an enlarged view of the vicinity of a first optical semiconductor element. An optical device 200 includes a substrate 10A, a first optical semiconductor element 11, and a second optical semiconductor element 12. In the present embodiment, the substrate 10A includes a first substrate 101 and a second substrate 102. The second optical semiconductor element 12 is mounted on the first substrate 101, and the first optical semiconductor element 11 is mounted on the second substrate 102. The first substrate 101 and the second substrate 102 are electrically connected to each other by wiring lines disposed on the first substrate 101 and the second substrate 102.

The optical device 200 of the present embodiment may further include a third optical semiconductor element 13. The third optical semiconductor element 13 is mounted on the first optical semiconductor element 101, similar to the second optical semiconductor element 12. The first optical semiconductor element 11, the second optical semiconductor element 12, and the third optical semiconductor element 13 of the present embodiment have a structure in which, for example, a p-type electrode, a p-type semiconductor layer, an active layer, an n-type semiconductor layer, and an n-type electrodes are layered, similar to the first embodiment. In the present embodiment, the first optical semiconductor element 11 is smaller in width and thickness than the second optical semiconductor element 12, and is smaller in width and thickness than the third optical semiconductor element 13.

The second substrate 102 of the substrate 10A includes a lower surface 102a and wiring lines 20A disposed on the lower surface 102a. The first optical semiconductor element 11 is disposed on the lower surface 102a of the second substrate 102. The first optical semiconductor element 11 includes a first electrode 11a and a second electrode 11b disposed on an upper surface of the first optical semiconductor element 11, and the first electrode 11a and the second electrode 11b are respectively connected to the wiring lines 20A.

The first substrate 101 of the substrate 10A includes an upper surface 101a and connection bumps 30 disposed on the upper surface 101a. The connection bumps 30 are provided in an upright manner on the upper surface 101a, and are respectively connected to the wiring lines 20A of the second substrate 102 on a tip side. The connection bumps 30 are respectively connected to external connection pads 21A disposed on the upper surface 101a on a base side. The connection bumps 30 include a first connection bump 30a and a second connection bump 30b. The external connection pads 21A include a first pad 21Aa connected to the first connection bump 30a and a second pad 21Ab connected to the second connection bump 30b. The second optical semiconductor element 12 and the third optical semiconductor element 13 are disposed on the upper surface 101a of the first substrate 101. The second optical semiconductor element 12 and the third optical semiconductor element 13 are disposed, for example, between the first connection bump 30a and the second connection bump 30b.

In the lower surface 102a of the second substrate 102, for example, the wiring lines 20A extend outward in the width direction of the first optical semiconductor element 11. The wiring lines 20A include a first wiring line 20Aa connected to the second electrode 11b and a second wiring line 20Ab connected to the first electrode 11a, of the first optical semiconductor element 11. Each of the first wiring line 20Aa and the second wiring line 20Ab, for example, extends up to the vicinity of an end portion of the second substrate 102 and bends in an L shape in the middle of the extension. The first substrate 101 and the second substrate 102 are fixed to each other by disposing the upper surface 101a and the lower surface 102a so as to face each other, and connecting the bent portions of the wiring lines 20A to the connection bumps 30 of the first substrate 101. For example, in a positional relationship in which the first substrate 101 is located below the second substrate 102, the connection bumps 30 support the second substrate 102. The first optical semiconductor element 11 is connected to the external connection pads 21A of the first substrate 101 via the wiring lines 20A of the second substrate 102 and the connection bumps 30 of the first substrate 101. Specifically, the first electrode 11a of the first optical semiconductor element 11 is connected to the second wiring line 20Ab and is connected to the second pad 21Ab via the second connection bump 30b. Further, the second electrode 11b of the first optical semiconductor element 11 is connected to the first wiring line 20Aa and is connected to the first pad 21Aa via the first connection bump 30a.

The second optical semiconductor element 12 and the third optical semiconductor element 13 are disposed between the upper surface 101a and the lower surface 102a facing each other. The height of the connection bumps 30 is larger than the thicknesses of the second optical semiconductor element 12 and the third optical semiconductor element 13 mounted on the first substrate 101. External connection pads 22 and 23 connected to n-type electrodes of the second optical semiconductor element 12 and the third optical semiconductor element 13 are provided on the upper surface 101a of the first substrate 101. The external connection pads 22 and 23 include portions extending outward in the length direction in a state where the second optical semiconductor element 12 and the third optical semiconductor element 13 are mounted, respectively. Each of the extending portions enables electrical connection to an external circuit, for example, via a bonding wire or the like. Contrary to the n-type electrodes, the p-type electrodes of the second optical semiconductor element 12 and the third optical semiconductor element 13 are located on the upper surfaces of the second optical semiconductor element 12 and the third optical semiconductor element 13, and thus each of the p-type electrodes can be electrically connected to an external circuit, for example, via a bonding wire or the like.

Each of the positions of the light emission points of the second optical semiconductor element 12 and the third optical semiconductor element 13 is unevenly located on one side rather than at the center in the thickness direction. For example, the second emission point 12c of the second optical semiconductor element 12 and the third emission point 13c of the third optical semiconductor element 13 are farther from the upper surface 101a of the first substrate 101 and are located close to the lower surface 102a of the second substrate 102. For example, since each of the second semiconductor element 12 and the third semiconductor element 13 includes a support substrate, in a case where the support substrate is mounted so as to be located on the first substrate 101 side, the position of the emission point can be unevenly located on the second substrate 102 side.

The first optical semiconductor element 11 is smaller in thickness than the second optical semiconductor element 12 and the third optical semiconductor element 13, and the second emission point 12c and the third emission point 13c, and the first emission point 11c can be brought close to each other in the thickness direction. Further, by using a ridge waveguide, the second emission point 12c of the second optical semiconductor element 12 can be brought close to the first optical semiconductor element 11 in the width direction, and similarly, in the third optical semiconductor element 13, the third emission point 13c can also be brought close to the first optical semiconductor element 11 in the width direction.

The closer the second optical semiconductor element 12 and the third optical semiconductor element 13 are brought to the upper surface 102a of the second substrate 102, the closer the second emission point 12c and the third emission point 13c are brought to the first emission point 11c in the thickness direction. However, the upper surfaces of the second optical semiconductor element 12 and the third optical semiconductor element 13 are provided with the upper surface pads 24 and 25 each connected to a corresponding p-type electrode, and the upper surface pads 24 and 25 are brought close to the wiring lines 20A of the upper surface 102a of the second substrate 102. In order to prevent short circuiting between the upper surface pads 24 and 25 and the wiring lines 20A, for example, an insulating film 28 may be provided on a surface of the wiring lines 20A. The insulating film 28 can be provided so as to cover the wiring lines 20A in a portion where the upper surface pads 24 and 25 and the wiring lines 20A overlap each other in a plan view.

In the present embodiment, in order to bring the second emission point 12c and the third emission point 13c close to the first emission point 11c in the thickness direction, a configuration is used in which the second optical semiconductor element 12 and the third optical semiconductor element 13 are disposed with a gap therebetween in the width direction, and the first optical semiconductor element 11 is located between the second optical semiconductor element 12 and the third optical semiconductor element 13. In such a configuration, similar to the first embodiment, the first emission point 11c is located next to the second emission point 12c in the width direction. In an alternative configuration, the gap between the second optical semiconductor element 12 and the third optical semiconductor element 13 in the width direction may be reduced, so that the first optical semiconductor element 11 is located above the second optical semiconductor element 12 and the third optical semiconductor element 13. In other words, in a plan view, the first optical semiconductor element 11 overlaps the second optical semiconductor element 12 and the third optical semiconductor element 13. In such a configuration, the second emission point 12c and the third emission point 13c are farther from the first emission point 11c in the thickness direction; however, the second emission point 12c and the third emission point 13c can be brought closer to the first emission point 11c in the width direction, and the distances between the three emission points can be brought close to each other. Further, a configuration is used in which the gap between the second optical semiconductor element 12 and the third optical semiconductor element 13 in the width direction may be reduced, so that the first optical semiconductor element 11 is located in front of the second optical semiconductor element 12 and the third optical semiconductor element 13. In other words, in a plan view, the first optical semiconductor element 11 does not overlap with the second optical semiconductor element 12 and the third optical semiconductor element 13. In such a configuration, the second emission point 12c and the third emission point 13c are farther from the first emission point 11c forward and backward in a length direction; however, the second emission point 12c and the third emission point 13c can be brought closer to the first emission point 11c in the width direction, and the distances between the three emission points can be brought close to each other.

By mounting the first optical semiconductor element 11 on a substrate different from that of the second optical semiconductor element 12 and the third optical semiconductor element 13 as in the present embodiment, it is easy to shorten the resonator length of the first optical semiconductor element 11. Since an optical semiconductor element having a short resonator length such as the first optical semiconductor element 11 can reduce power consumption when applied to a light emitting device, it is suitable for an application such as augmented reality (AR) glasses that do not require high light output.

The substrate 10, the first substrate 101, and the second substrate 102 may be, for example, a ceramic substrate or an organic substrate, or an insulating or semi-insulating substrate. Examples of the ceramic material used for the ceramic substrate include, for example, an aluminum oxide-based sintered body, a mullite-based sintered body, a silicon carbide sintered body, an aluminum nitride-based sintered body, and a glass ceramic sintered body. Examples of the resin material used in the organic substrate include, for example, an epoxy resin, a polyimide resin, a polyester resin, an acrylic resin, a phenol resin, and a fluorine-based resin. Examples of the insulating and semi-insulating substrate include a Si substrate and a SiC substrate, and among these, the Si substrate may be selected in consideration of workability, heat dissipation, and cost.

The color of an emitted light of the first optical semiconductor element 11, the color of an emitted light of the second optical semiconductor element 12, and the color of an emitted light of the third optical semiconductor element 13 may be different from each other. For example, the emitted light of the first optical semiconductor element 11 is blue light, and the emitted light of the second optical semiconductor element 12 is red light. The emitted light of the third optical semiconductor element 13 is, for example, green light. The second optical semiconductor element 12 is formed of, for example, a gallium arsenide (GaAs)-based semiconductor. The first optical semiconductor element 11 and the third optical semiconductor element 13 are formed of, for example, a gallium nitride (GaN)-based semiconductor.

Figure 9:
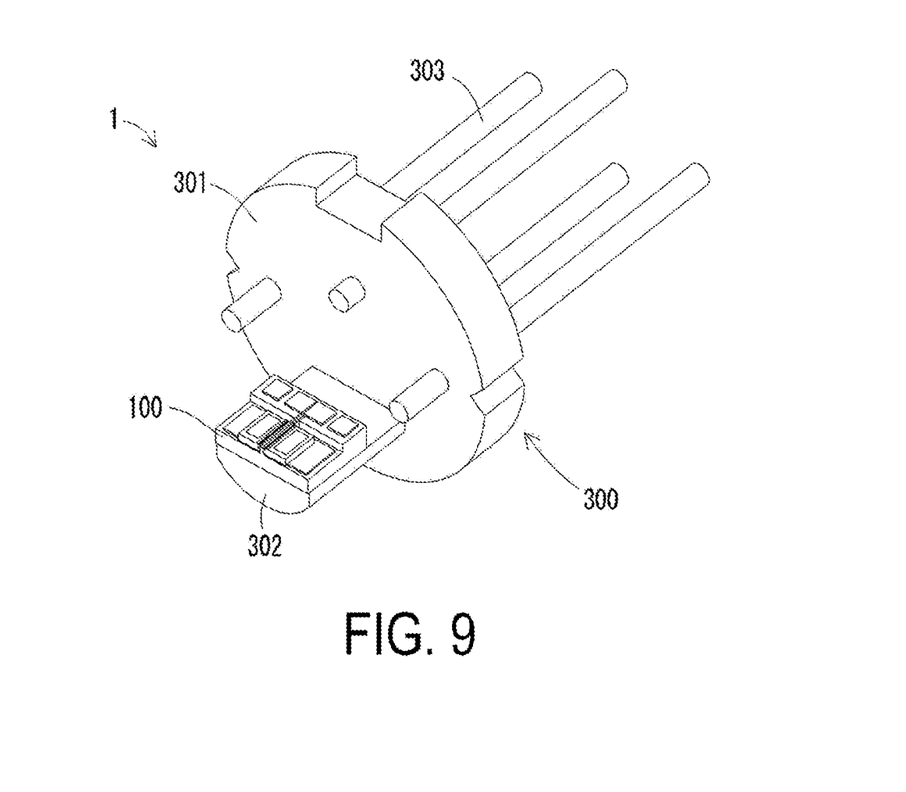
FIG. 9 is a perspective view illustrating an example of a light emitting device.

FIG. 9 is a perspective view illustrating an example of a light emitting device. A light emitting device 1 illustrated in FIG. 9 includes the above-described optical device 100 and a package 300 in which the optical device 100 is mounted. The package 300 of the present example is a so-called TO-CAN type package. The optical device 100 is mounted on a heat block 302 provided on a stem 301. For example, the external connection pads 21 or the like of the optical device 100 and pins 303 are electrically connected by bonding wires (not illustrated). The light emitting device 1 may further include a protective cap or the like. When a drive current is supplied via the pins 303, light is emitted from each of the first optical semiconductor element 11, the second optical semiconductor element 12, and the third optical semiconductor element 13 of the optical device 100.

Figure 10:
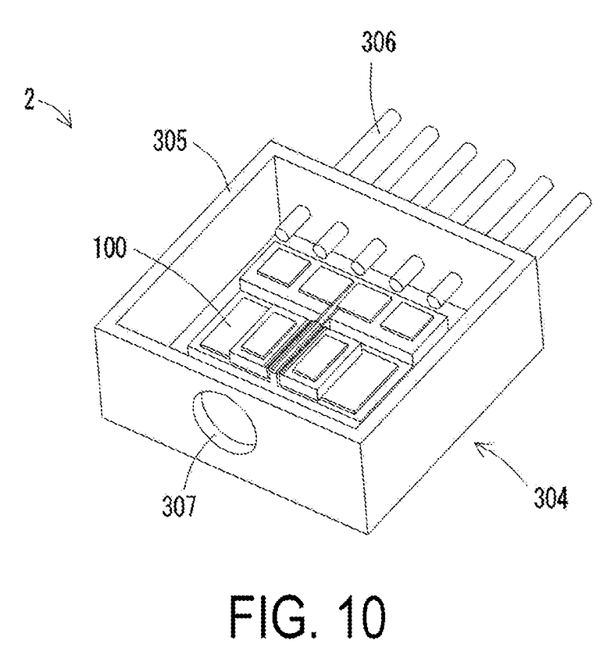
FIG. 10 is a perspective view illustrating another example of the light emitting device.

FIG. 10 is a perspective view illustrating another example of the light emitting device. A light emitting device 2 illustrated in FIG. 10 includes the above-described optical device 100 and a package 304 in which the optical device 100 is mounted. The package 304 of the present example is a surface-mount-type package. The package 304 includes a case 305 and pins 306 passing through a side wall of the case 305. The optical device 100 is housed within the case 305, and for example, the external connection pads 21 or the like of the optical device 100 and the pins 306 are electrically connected by bonding wires (not illustrated). A light extraction port 307 is provided on the side wall of the case 305. When a drive current is supplied via the pins 306, light is emitted from each of the first optical semiconductor element 11, the second optical semiconductor element 12, and the third optical semiconductor element 13 of the optical device 100. The emitted light is extracted from the light extraction port 307 to the outside of the device.

The light emitting devices 1 and 2 can be used, for example, as a light source of a projection system. The light emitted from the light emitting devices 1 and 2 is reflected by a scanning mirror and irradiates a screen. The scanning mirror can shift a position at which the emitted light from the light emitting devices 1 and 2 is projected onto the screen by, for example, changing a reflection angle. By continuously shifting the projected position on the screen, a color image can be displayed on the screen. Since, in the optical device 100, the emission points of the first optical semiconductor element 11, the second optical semiconductor element 12, and the third optical semiconductor element 13, are close to each other, for example, the number of components of an optical system such as a lens or mirror for controlling the emitted light can be reduced, and each component can be reduced in size.

The optical device and the light emitting device of the present disclosure can realize further size reduction.

In the present disclosure, the terms "upper surface", "lower surface", and the like are merely for convenience of description, and do not identify any orientation of the optical device when in use. For example, the "upper surface" may be oriented in any direction when the optical device is in use.

In the present disclosure, descriptions of "first", "second", and the like are identifiers for distinguishing the configurations. Configurations distinguished in the description by "first", "second", and the like in the present disclosure are interchangeable in terms of the number of the configuration. For example, the first substrate and the second substrate can interchange "first" and "second" serving as identifiers. The identifiers are interchanged simultaneously. The configurations are distinguished after the identifiers are interchanged. The identifiers may be deleted. Configurations with deleted identifiers are distinguished by reference sign. No interpretation on the order of the configurations, no grounds for the presence of an identifier of a lower value, and no grounds for the presence of an identifier of a higher value shall be given based solely on the description of identifiers such as "first" and "second".

The present disclosure has been described in detail above, but the present disclosure is not limited to the embodiments described above, and various modifications, improvements, and the like can be made within a scope not departing from the gist of the present disclosure. Needless to say, all or a part of each of the above-described embodiments can be appropriately combined in a non-contradicting range.

REFERENCE SIGNS LIST 1, 2 Light emitting device
10, 10A Substrate
10a Upper surface
10b Recessed portion
10c Mounting region
10d Connection region
10e Protruding portion
11 First optical semiconductor element
11a First electrode
11b Second electrode
11c First emission point
12 Second optical semiconductor element
12a First side surface
12b Second side surface
12c Second emission point
13 Third optical semiconductor element
13c Third emission point
20, 20A Wiring line
20Aa First wiring line
20Ab Second wiring line
20a First wiring line
20b Second wiring line
21, 21A External connection pad
21Aa First pad
21Ab Second pad
21a First pad
21b Second pad
22, 23 External connection pad
24, 25 Upper surface pad
26, 27 External connection pad
28 Insulating film
30 Connection bump
30a First connection bump
30b Second connection bump
100 Optical device
101 First substrate
101a Upper surface
102 Second substrate
102a Lower surface
200 Optical device
300 Package
301 Stem
302 Heat block
303 Pin
304 Package
305 Case
306 Pin
307 Light extraction port

The invention claimed is:

1. An optical device comprising:
a substrate comprising an upper surface and wiring lines disposed on the upper surface;

a first optical semiconductor element disposed on the upper surface of the substrate; and
a second optical semiconductor element and a third optical semiconductor element each located so as to be adjacent to the first optical semiconductor element, wherein
the first optical semiconductor element comprises a first electrode and a second electrode each disposed at a lower end portion of the first optical semiconductor element and each connected to a corresponding one of the wiring lines,
the second optical semiconductor element comprises a first side surface, a second side surface located farther from the first optical semiconductor element than the first side surface, and a second emission point emitting light,
the third optical semiconductor element comprises a third side surface, a fourth side surface located farther from the first optical semiconductor element than the third side surface, and a third emission point emitting light,
a width of the first optical semiconductor element is smaller than each of a width of the second optical semiconductor element and a width of the third optical semiconductor element,
the second emission point is located closer to the first side surface side than the second side surface, and
the third emission point is located closer to the third side surface side than the fourth side surface.

2. The optical device according to claim 1, wherein
the first optical semiconductor element comprises a plurality of semiconductor layers, and
the first electrode is connected to an upper surface of the semiconductor layers and is drawn to the lower end portion.

3. The optical device according to claim 1, wherein
the second optical semiconductor element comprises a third electrode and a fourth electrode,
the substrate further comprises second wiring lines connecting to the second optical semiconductor element, and
at least one of the third electrode or the fourth electrode is electrically connected to a corresponding one of the second wiring lines via a bonding wire.

4. The optical device according to claim 1, wherein
the substrate comprises a protruding portion protruding upward,
a thickness of the first optical semiconductor element is smaller than a thickness of the second optical semiconductor element,
the first optical semiconductor element is mounted on the protruding portion, and
the second optical semiconductor element is mounted on a region other than the protruding portion.

5. The optical device according to claim 1, further, wherein
the third optical semiconductor element is located on an opposite side of the second optical semiconductor element with the first optical semiconductor element interposed between the third optical semiconductor element and the second optical semiconductor element.

6. The optical device according to claim 1, wherein
a thickness of the first optical semiconductor element is from 5 to 50 μm.

7. A light emitting device comprising:
the optical device according to claim 1; and
a package in which the optical device is mounted.

8. An optical device comprising:
a substrate comprising an upper surface, wiring lines disposed on the upper surface and a protruding portion protruding upward;
a first optical semiconductor element and a second optical semiconductor element each disposed on the upper surface of the substrate, the second optical semiconductor element being adjacent to the first optical semiconductor element, wherein:
the first optical semiconductor element comprises a first electrode and a second electrode each disposed at a lower end portion of the first optical semiconductor element and each connected to a corresponding one of the wiring lines,
a thickness of the first optical semiconductor element is smaller than a thickness of the second optical semiconductor element,
the first optical semiconductor element is mounted on the protruding portion, and
the second optical semiconductor element is mounted on a region other than the protruding portion.

9. The optical device according to claim 8, wherein
the second optical semiconductor element further comprises a first side surface, a second side surface located farther from the first optical semiconductor element than the first side surface, and a second emission point emitting light, and
the second emission point is located closer to the first side surface side than the second side surface.

10. The optical device according to claim 9, wherein
the first optical semiconductor element further comprises a first emission point emitting light, and
the first emission point is located next to the second emission point.

11. The optical device according to claim 10, wherein
a length of the first optical semiconductor element is shorter than a length of the second optical semiconductor element, and
the first emission point is located next to the second emission point.

12. The optical device according to claim 8, wherein
the second optical semiconductor element further comprises a second emission point emitting light, and
the second emission point is located above the protruding portion.

13. The optical device according to claim 8, further comprising:
a third optical semiconductor element disposed on the upper surface of the substrate, wherein
the third optical semiconductor element is located on an opposite side of the second optical semiconductor element with the protruding portion interposed between the third optical semiconductor element and the second optical semiconductor element.

14. The optical device according to claim 13, wherein
the third optical semiconductor element further comprises a third emission point emitting light, and
the third emission point is located above the protruding portion.

15. The optical device according to claim 8, further comprising:
a third optical semiconductor element disposed on the upper surface of the substrate and adjacent to the first optical semiconductor element, wherein
the third optical semiconductor element further comprises a third side surface, a fourth side surface located farther from the first optical semiconductor element than the third side surface, and a third emission point emitting light, and the third emission point is located closer to the third side surface side than the fourth side surface.

* * * * *